United States Patent
Spadafora et al.

(10) Patent No.: US 11,408,312 B2
(45) Date of Patent: Aug. 9, 2022

(54) PCV VALVE

(71) Applicant: Mahle International GmbH, Stuttgart (DE)

(72) Inventors: Antonio Spadafora, Troy, MI (US); Eric Mathes, Royal Oak, MI (US); Kathleen Kogelschatz, Birmingham, MI (US); Michael Salt, West Bloomfield, MI (US); Jason Dreveny, Chatham (CA); Tom Seixas, Troy, MI (US); Tammy Libbrecht, Chatham (CA)

(73) Assignee: Mahle International GmbH

( * ) Notice: Subject to any disclaimer, the term of this patent is extended or adjusted under 35 U.S.C. 154(b) by 0 days.

(21) Appl. No.: 17/412,709

(22) Filed: Aug. 26, 2021

(65) Prior Publication Data

US 2022/0090525 A1     Mar. 24, 2022

Related U.S. Application Data

(60) Provisional application No. 63/081,102, filed on Sep. 21, 2020.

(51) Int. Cl.
*F01M 13/00* (2006.01)
*F16K 17/04* (2006.01)

(52) U.S. Cl.
CPC ......... *F01M 13/0011* (2013.01); *F16K 17/04* (2013.01)

(58) Field of Classification Search
CPC ............................ F16K 17/04; F01M 13/0011
See application file for complete search history.

(56) References Cited

U.S. PATENT DOCUMENTS

| | | | |
|---|---|---|---|
| 10,767,590 B1* | 9/2020 | Jentz | G07C 5/0816 |
| 2005/0022795 A1* | 2/2005 | Beyer | F01M 11/10 73/114.38 |
| 2017/0335786 A1* | 11/2017 | Smolarek | F02D 41/2464 |
| 2020/0123944 A1* | 4/2020 | Ishikawa | F02M 35/10209 |

FOREIGN PATENT DOCUMENTS

| | | | | |
|---|---|---|---|---|
| JP | 2011236854 A | | 11/2011 | |
| JP | 2019183827 A | * | 10/2019 | ......... F01M 13/0011 |

* cited by examiner

*Primary Examiner* — Kevin A Lathers
(74) *Attorney, Agent, or Firm* — Fishman Stewart PLLC

(57) ABSTRACT

A positive crankcase ventilation (PCV) valve includes a tubular body extending along an axis between a first end and a second end, the tubular body having an outer diameter and an inner diameter defining a wall around a central passage that extends through the tubular body and is orthogonal to the axis, and a metering device secured within the central passage adjacent the first end. The wall includes a window between the metering device and second end, and the window defines an air flow path through the wall and into the central passage for detecting a disconnection of the PCV valve from the crankcase, wherein a total area of the window is greater than an open axial area within the metering device when the metering device is in a maximum flow condition.

20 Claims, 13 Drawing Sheets

PCV VALVE

CROSS-REFERENCE TO RELATED APPLICATION

This application claims priority to U.S. Provisional Patent Application Ser. No. 63/081,102, filed on Sep. 21, 2020, the contents of each of which are hereby expressly incorporated by reference in their entireties.

TECHNOLOGY FIELD

The exemplary illustrations described herein are generally directed to a blow-by gas returning device for the purpose of returning blow-by gas leaking from a combustion chamber of an engine to the combustion chamber by allowing the blow-by gas to flow in a returning passage and an intake manifold passage through a PCV valve.

BACKGROUND

Automotive engines use a closed or positive crankcase ventilation (PCV) system to ensure that harmful vapors do not escape into the atmosphere. A typical PCV system establishes a direct air flow out from the engine crankcase to the intake manifold to ensure positive ventilation, reducing pressure in the crankcase and allowing for any blowby combustion gases to pass back into the air intake.

Typically, during operation of the engine, flow through known PCV valves ranges from negligible (during idle and high vacuum in the air intake) to a maximum—which occurs during higher speed operation (and the air intake is under less than high vacuum). When under idle the air intake is under high vacuum, a pintle within the PCV valve is seated against an inside end of the PCV valved and any gas flow is largely cut off. During operation of the engine, there is not a high vacuum in the air intake, and a pressure differential is formed on either side of the pintle, causing movement of the pintle and resulting in gas flow from the crankcase to the intake manifold.

From time to time, the PCV valve may become dislodged from the crankcase. When this happens, pressure on the air intake side of the PCV valve is no longer high vacuum under any set of conditions, and the PCV valve allows for at least some gas flow because the pintle is no longer seated. This dislodged situation thereby results in outside air flow through the PCV valve, and the amount of flow through the PCV valve can be indistinguishable from the mass air flow that occurs during normal operation. Thus, mass flow rate sensors in the engine may not detect when the PCV valve has become dislodged, and no warning will be sent to the vehicle's computer or to the driver. A vehicle operating with a dislodged PCV valve can thereby release non-combusted gases directly into the environment.

Emissions requirements continue to be stricter and vehicles need to be able to quickly detect a PCV valve that has become disconnected from the crankcase. The current PCV valves have restricted flow paths through the pintle assembly, and the volume of air is commonly undetectable by the current air sensors within the intake manifold and engine controller. One known device includes tiny holes in the body of a PCV valve, that allow for some air to pass into the PCV valve when it becomes dislodged. However, because typical operation of the PCV valve results in some gas flow, a condition can still arise when a mass flow sensor cannot detect that the PCV valve has become dislodged.

Accordingly, there remains a need for an improved PCV valve that can be detected when it is disconnected from the crankcase.

BRIEF DESCRIPTION

The disclosure is directed toward an apparatus and method for an improved PCV valve that can be detected when it is disconnected from the crankcase.

According to one aspect, a positive crankcase ventilation (PCV) valve includes a tubular body extending along an axis between a first end and a second end, the tubular body having an outer diameter and an inner diameter defining a wall around a central passage that extends through the tubular body and is orthogonal to the axis, and a metering device secured within the central passage adjacent the first end. The wall includes a window between the metering device and second end, and the window defines an air flow path through the wall and into the central passage for detecting a disconnection of the PCV valve from the crankcase, wherein a total area of the window is greater than an open axial area within the metering device when the metering device is in a maximum flow condition.

A method of manufacturing a positive crankcase ventilation (PCV) valve includes providing a tubular body that extends along an axis between a first end and a second end, the tubular body having an outer diameter and an inner diameter defining a wall around a central passage that extends through the tubular body and is orthogonal to the axis, securing a metering device within the central passage, adjacent the first end, and positioning a window in the wall between the metering device and second end, wherein the window defines an air flow path through the wall and into the central passage for detecting a disconnection of the PCV valve from the crankcase, and wherein a total area of the window is greater than an open axial area within the metering device when the metering device is in a maximum flow condition.

An engine includes a crankcase, an air intake, and positive crankcase ventilation (PCV) valve positioned in fluidic contact between the crankcase and the air intake. The PCV valve includes a tubular body extending along an axis between a first end and a second end, the tubular body having an outer diameter and an inner diameter defining a wall around a central passage that extends through the tubular body and is orthogonal to the axis, a metering device secured within the central passage adjacent the first end. The wall includes a window between the metering device and second end, and the window defines an air flow path through the wall and into the central passage for detecting a disconnection of the PCV valve from the crankcase, wherein a total area of the window is greater than an open axial area within the metering device when the metering device is in a maximum flow condition.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description.

FIG. 4 is a perspective view detailing the exemplary PCV valve detailing a window area compared to the cross-sectional area of a central passage;

FIG. 5 is a side view of the exemplary PCV valve installed on the crankcase;

FIG. 6 is a side view of the exemplary PCV valve in an uninstalled or disconnected condition;

DETAILED DESCRIPTION

Figure 1:
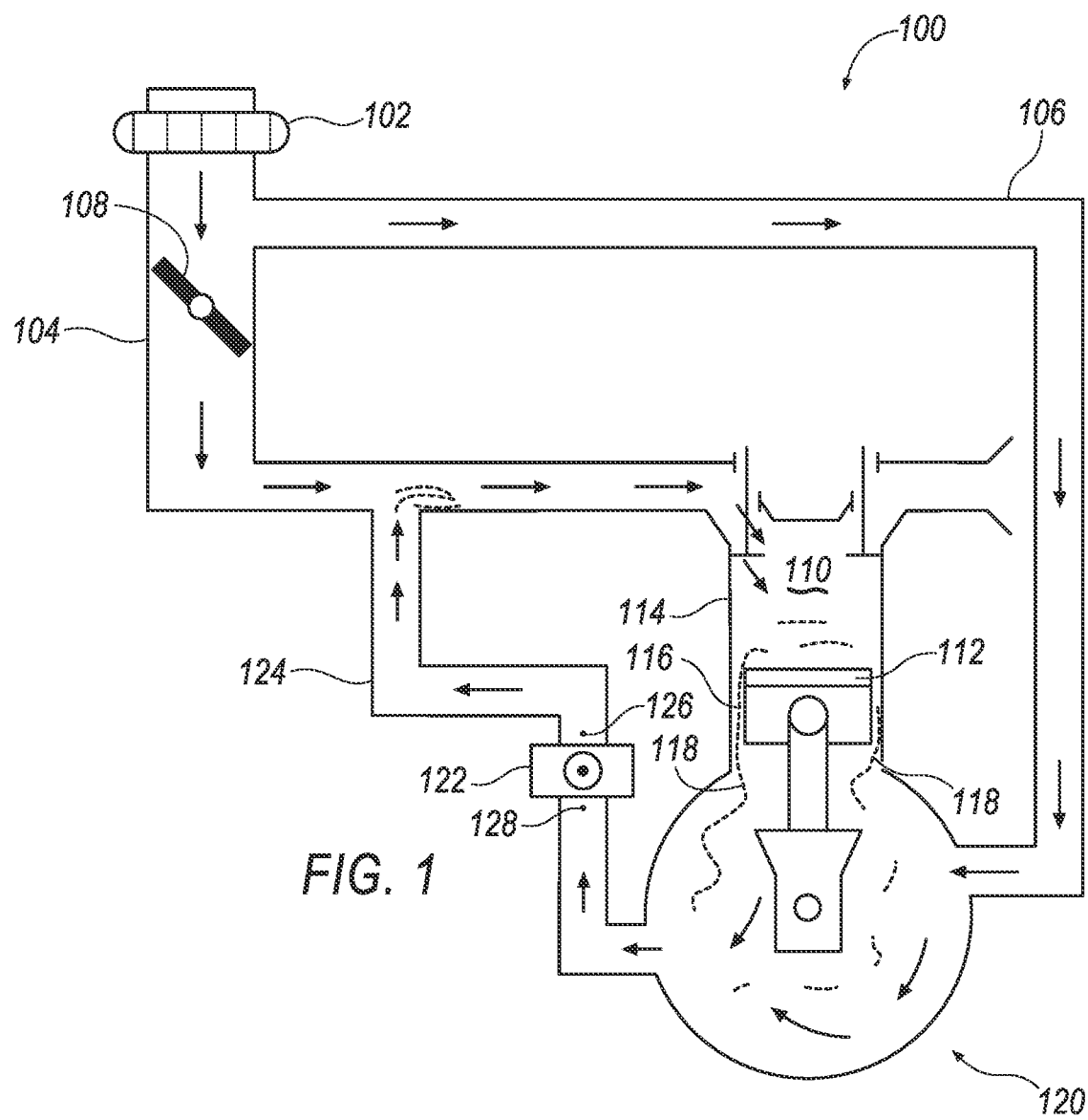
FIG. 1 illustrates a schematic of an engine with a PCV valve.

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Furthermore, the exemplary illustrations described herein are not intended to be exhaustive or otherwise limiting or restricted to the precise form and configuration shown in the drawings and disclosed in the following detailed description.

Following are several figures and illustrations of an exemplary PCV valve according to the disclosure.

Figure 2A:
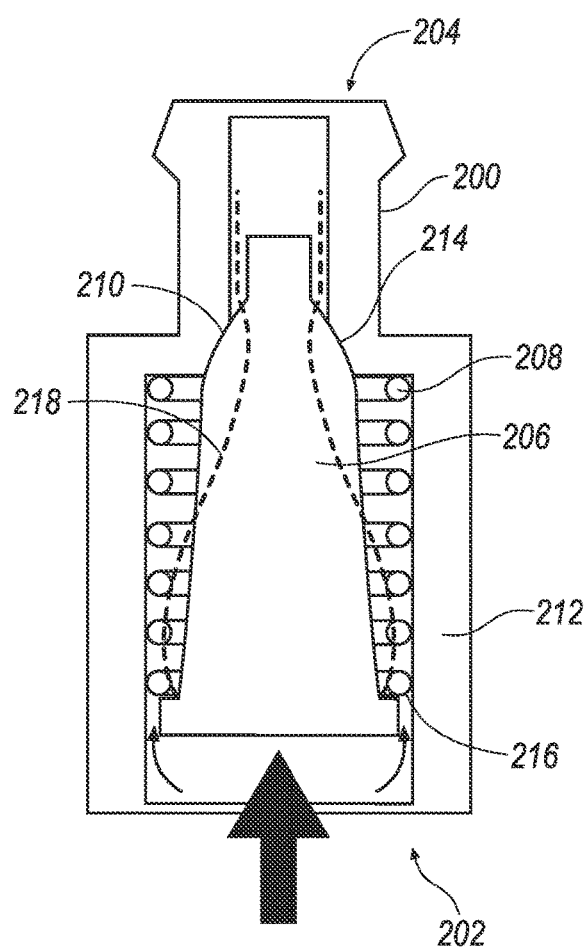
FIG. 2A illustrates an exemplary PCV valve in a minimal flow, idle condition.
Figure 2B:
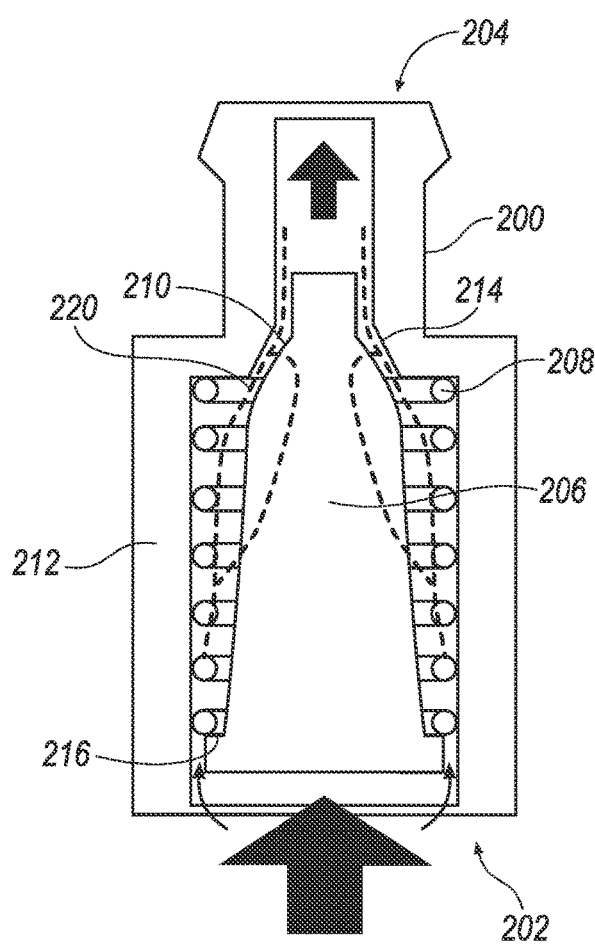
FIG. 2B illustrates an exemplary PCV valve in a maximum flow, operating condition.
Figure 2C:
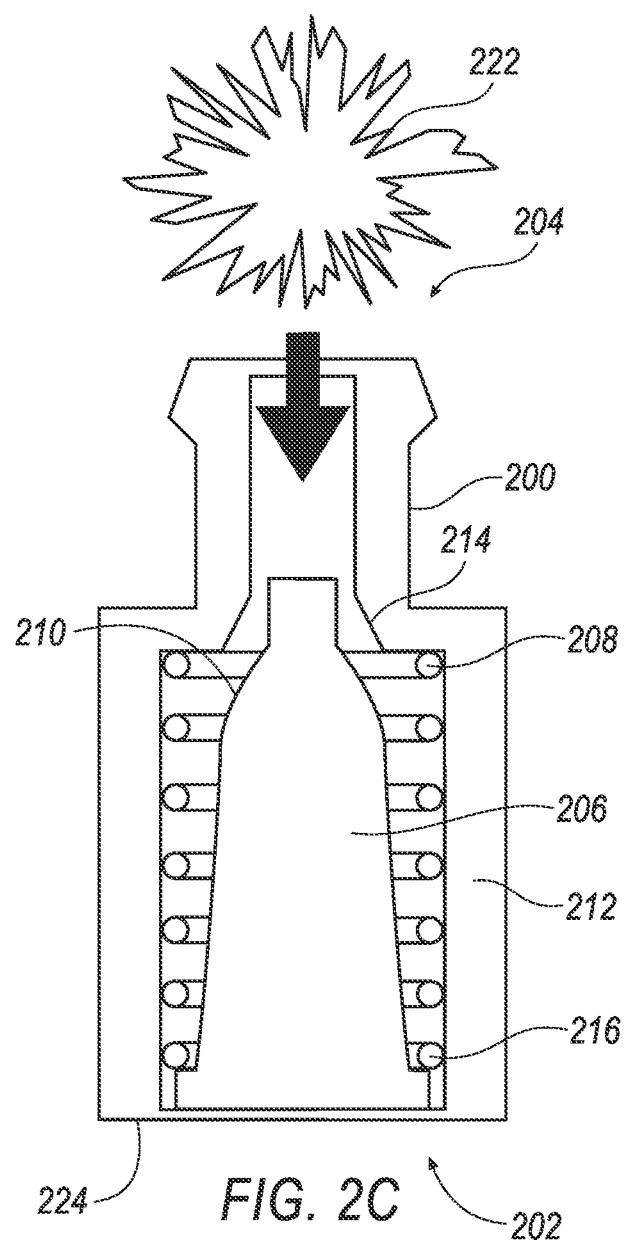
FIG. 2C illustrates an exemplary PCV valve in a backfire condition.

FIG. 1 illustrates a schematic of an engine with a PCV valve, and FIGS. 2A-2C illustrate exemplary operating states of the PCV valve under minimal flow, idle condition (FIG. 2A), under a maximum flow, operating condition (FIG. 2B), and in a backfire condition (FIG. 2C).

Referring to FIG. 1, an engine 100 includes a mass airflow sensor 102 that passes metered air to an intake manifold or air inlet line 104 and a breather line 106. Air inlet line 104 is throttled via a throttle body plate 108 to pass to a combustion chamber 110. Combustion chamber 110 is fed by air through air inlet line 104, and also by fuel (lines not shown) during the combustion process. During combustion, a piston 112 reciprocates against a piston wall 114 and as known, blowby gases 116 can pass as blowby gases 118 between piston 112 and piston wall 114 (including piston rings positioned in grooves in the piston, rings and grooves not shown) and into a crankcase 120 of engine 100. Blowby gasses 118 not only can cause pressure to build within crankcase 120, but also typically include uncombusted fuel/air that can result in excess emissions that exceed air quality standards and requirements for combustion engines.

Conventionally, due to vehicle sensors' detection for mass air sensors within the air intake and a vehicle's engine controller controlling and monitoring the mix of the amount of air flow through the air intake, existing sensors are unable to reliably determine if the PCV valve has been disconnected or loosened. Because a known PCV valve restricts the air flow similarly in both states; when securely connected, or the atmospheric air flow through the PCV valve when in a disconnected state. And if the PCV valve is disconnected the hydrocarbons, and combustion gases, are vented through the open port or connection opening in the crankcase or engine block into the atmosphere. Thereby increasing the vehicle's emission with unregulated combustion gases, and hydrocarbons able to flow freely without emissions filtration.

Due to increasing concerns and tightening of emissions standards, such as those required by CARB, this situation is problematic since vapors and combustion by-products can be released through the open port, or opening in the crankcase, to the atmosphere when the PCV valve is disconnected. For example, CARB, in the Cal. Code Regs. Tit. 13 Section 1968.2 further requires that vehicles in 2024 subject to emission monitoring must include monitoring and detection of the connection/seal between the PCV valve and the crankcase. This, and similar emission standards globally, are requiring vehicles have a way to diagnostic ability to detect that the PCV valve is secured and functioning in order to capture and direct the air leaving through the PCV valve into the intake air to further reduce any hydrocarbons and combustion gases from the vehicle emissions.

As such, a PCV valve 122 is positioned on a return line that is linked fluidically from crankcase 120 to air inlet line 104. Typically, because the air flow is metered by mass airflow sensor 102, return to the air inlet line 104 is after mass airflow sensor 102.

Engine 100 may be operated from an idle condition to a full throttle condition and anywhere between. Also, occasionally an engine backfire may occur in engine 100, and thus PCV valve 122 adjusts its operation based on these changing or variable conditions.

For instance, referring to FIGS. 2A, 2B, and 2C, a very generalized illustration of a PCV valve is shown, referred to as PCV valve 200. PCV valve 200 includes an inlet 202, an outlet 204, a pintle 206, and a compression spring 208. Pintle 206, in this example, includes a tapered or conical surface 210, and PCV valve 200 includes a housing 212 having an internal tapered or conical surface 214 that is configured to seal or "seat" with tapered or conical surface 210. As can be appreciated, because of the tapered or conical arrangement between surface 210 and surface 214, as pintle 206 moves within housing 212, an opening between surfaces 210 and 214 varies in cross-sectional area, allowing for a control of mass flow through PCV valve 200.

As shown, pintle 206 includes a lip 216, against which compression spring 208 is pressed. PCV valve 200, corresponding with PCV valve 122 in FIG. 1, is positioned such that outlet 204 corresponds with or faces in the direction of a first location 126, and such that inlet 202 corresponds with or faces in the direction of a second location 128.

In operation and depending on operating conditions of engine 100, pintle 206 is caused to adjust its location. For instance, FIG. 2A corresponds with an idle operation of engine 100, during which time air inlet line 104 is in a high vacuum state. Being in high vacuum, the high vacuum corresponds with location 126 and outlet 204, which causes pintle 206 to pull against compression spring 208, causing pintle to move toward outlet 204 and forcing surfaces 210 and 214 to pull against one another. As such, a minimal flow 218 (FIG. 2A) can result, and under certain conditions there may be a full cutoff of flow entirely.

With the throttle applied to engine 100, and at higher rates of reciprocating operation of the engine than under idle conditions, full vacuum no longer remains in air intake line 104, which causes a reduced amount of pressure to counter compression spring 208. The changed pressure differential across pintle 206 causes pintle 206 to move toward inlet 202 and resulting in a greater amount of clearance between surfaces 210 and 214. As engine speed increases, and hence an increased propensity for blowby gases 116 to pass into crankcase 120, PCV valve thereby opens up and allows increased flow 220 (FIG. 2B). Thus, operating conditions of the engine and particularly the vacuum condition of air intake line 104 (itself dependent on engine speed) thereby causes PCV valve to open and close in concert with engine speed and based on the vacuum condition of air intake line 104.

FIG. 2C illustrates the occasional condition that may occur, when backfire of engine 100 happened. In such condition, a sudden burst of pressure occurs in intake line 104 due to backfire, which suddenly and explosively 222 causes high pressure to press against pintle 206, forcing a rapid movement of pintle 206 toward inlet 202, with lip 216 engaging against an end 224 of housing 212, preventing potentially damaging pressure to be transmitted to crankcase 120.

It is understood that the description above is general for operation of PCV valve 200, and that other configurations and arrangements may likewise be contemplated as well. For instance, surfaces 210/214 may not be conical or tapered, but it is understood that the general operation is effected by enabling a variable amount of cross-sectional area to form, for operation of the PCV valve, depending on the vacuum condition of the intake manifold or air intake line.

Figure 3:
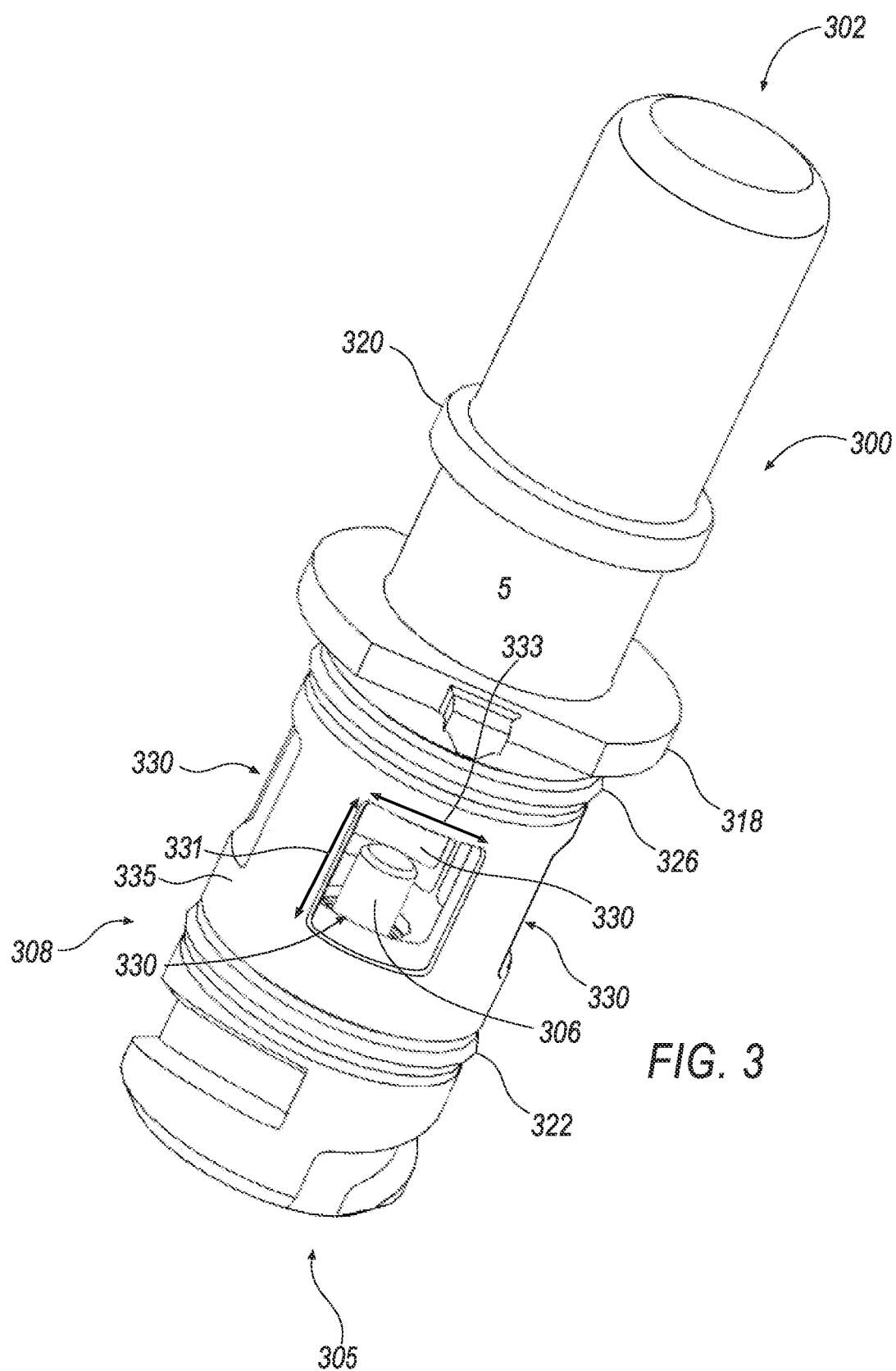
FIG. 3 is a perspective view of an exemplary PCV valve.
Figure 4:
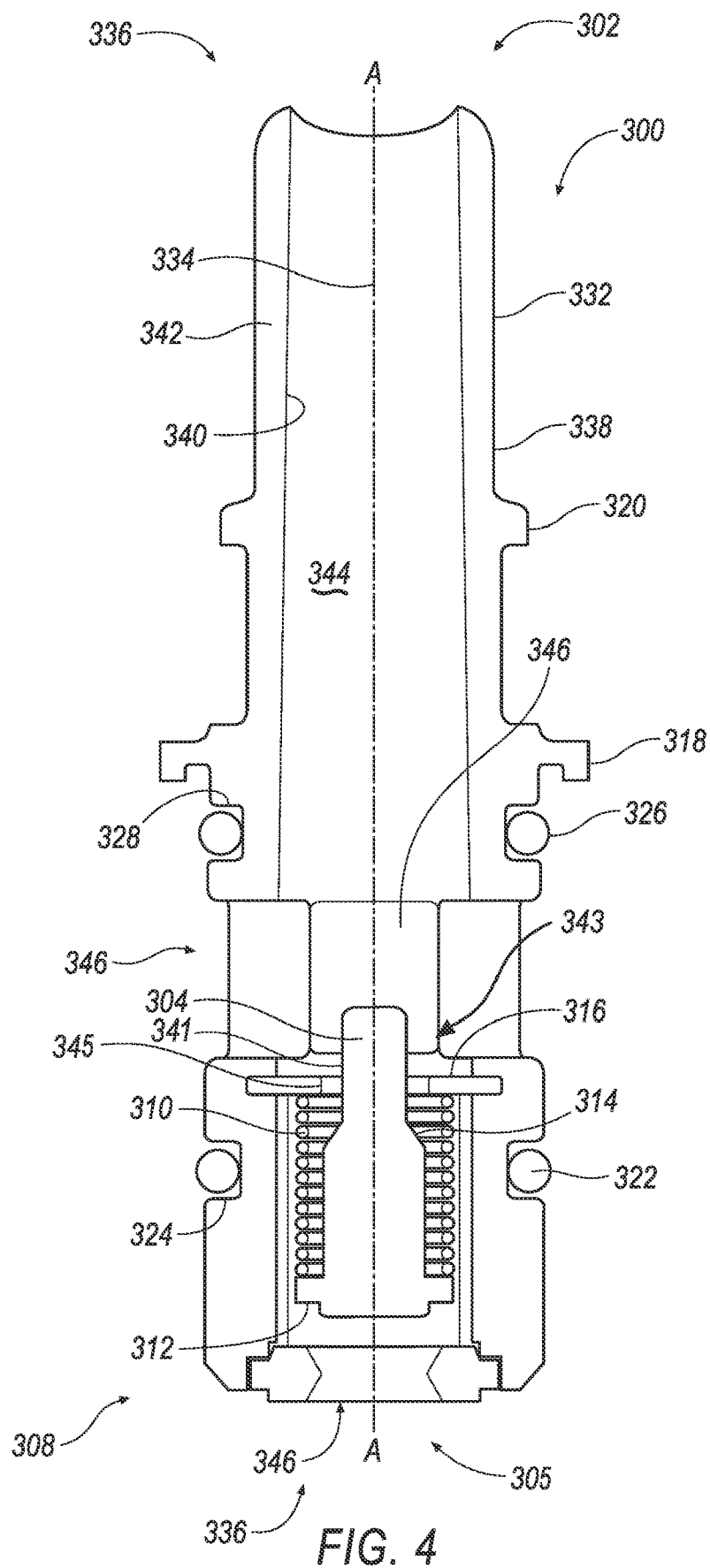
FIG. 4 is a cross-sectional view of an exemplary PCV valve.

FIG. 3 illustrates a perspective view of a PCV valve 300 according to the disclosure, and FIG. 4 illustrates a cross-sectional view of PCV valve 300. PCV valve includes an outlet 302 and an inlet 305, which generally accords with inlet 202 and outlet 204 and locations 128 and 126 in engine 100. A pintle 306 is positioned within a metering device 308, and a compression spring 310 is positioned against a lip 312 of pintle 306. In the disclosed example, pintle 306 includes tapered or conical surface 314 which can be pressed against a washer or seal ring 316, itself positioned and contained in a groove. Thus, under conditions as described above, when PCV valve 300 is properly installed within engine 100, vacuum conditions of air intake line 104 cause a varying degree of vacuum to form against pintle 304, resulting in a vacuum-dependent pressure to form on pintle 304, thereby causing operation of the PCV valve to conform with the above-described operation.

PCV valve 200 may be secured via known methods, including various twist and lock features, between the valve and the crankcase or engine block (not shown). The exemplary PCV valve 300 includes a threaded portion proximate inlet 305, and tabs in line with a securing lip 318, for securing to the crankcase.

Figure 5:
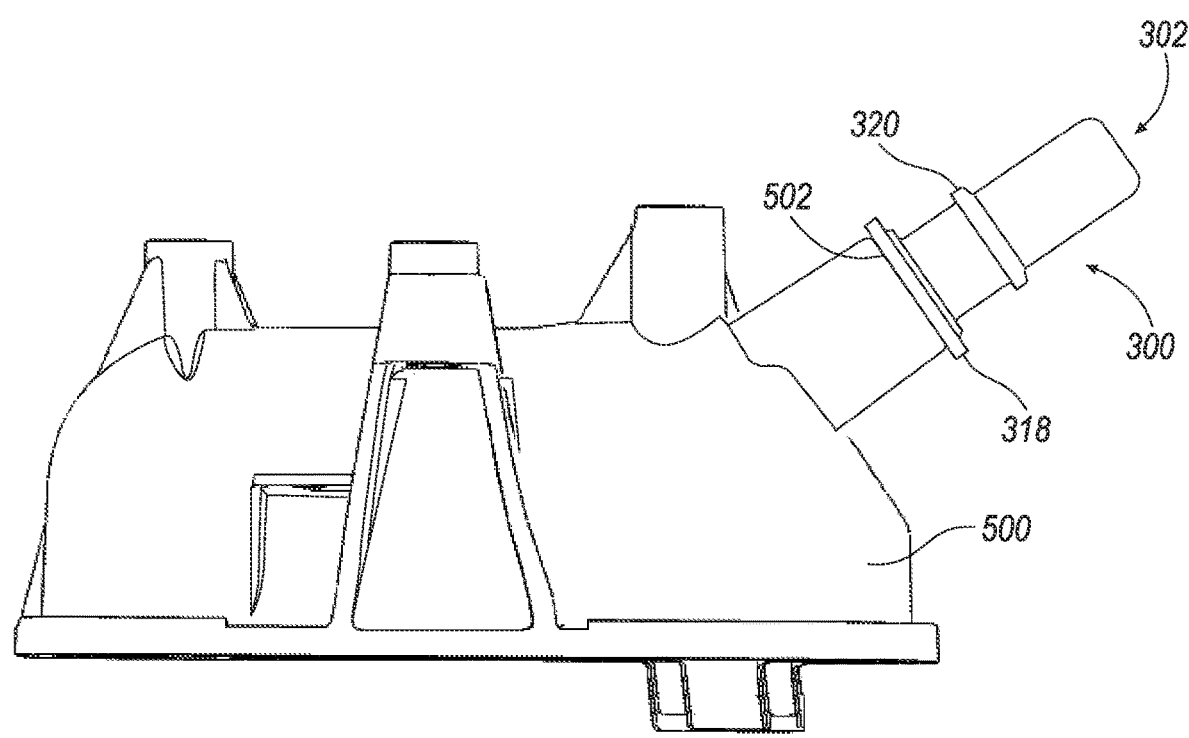
FIG. 5 is a side view of the PCV valve fully secured to a crankcase.

FIG. 5 is a side view of PCV valve 300 fully secured to a crankcase 500. Securing lip 318 of PCV valve 300 is thereby pressed against an outer bore 502 of crankcase 500. An optional tube lip 320 may be provided on PCV valve 300 which can serve as a compression arrangement so that air inlet line 104 is a flexible tube (not shown), in some arrangements. PCV valve 300 includes a first O-ring 322 in a first groove 324 and a second O-ring 326 in a second groove 328.

As such, when properly installed, O-rings 322, 326 thereby cause a gas seal to form against an inner surface of outer bore 502, allowing for a controlled flow of gases to pass through PCV valve 300 during operation of the engine.

As emission CARB (California Air Resources Board) standards or regulations have increased, CARB standards require vehicle diagnostics to be able to determine if the PCV valve is not secured properly to the crankcase or engine block. If PCV valve 300 is not properly secured, combustion, fuel vapors, and generally blowby gases may pass directly into the atmosphere, bypassing emissions and releasing unacceptable levels of hydrocarbons or combustion gases from the crankcase into the atmosphere. Typically, exemplary PCV valve 300 and that shown in FIG. 1 allows for the vehicle diagnostics to detect unregulated air that is able to travel through the PCV valve and by-pass metering device 308.

Figure 6:
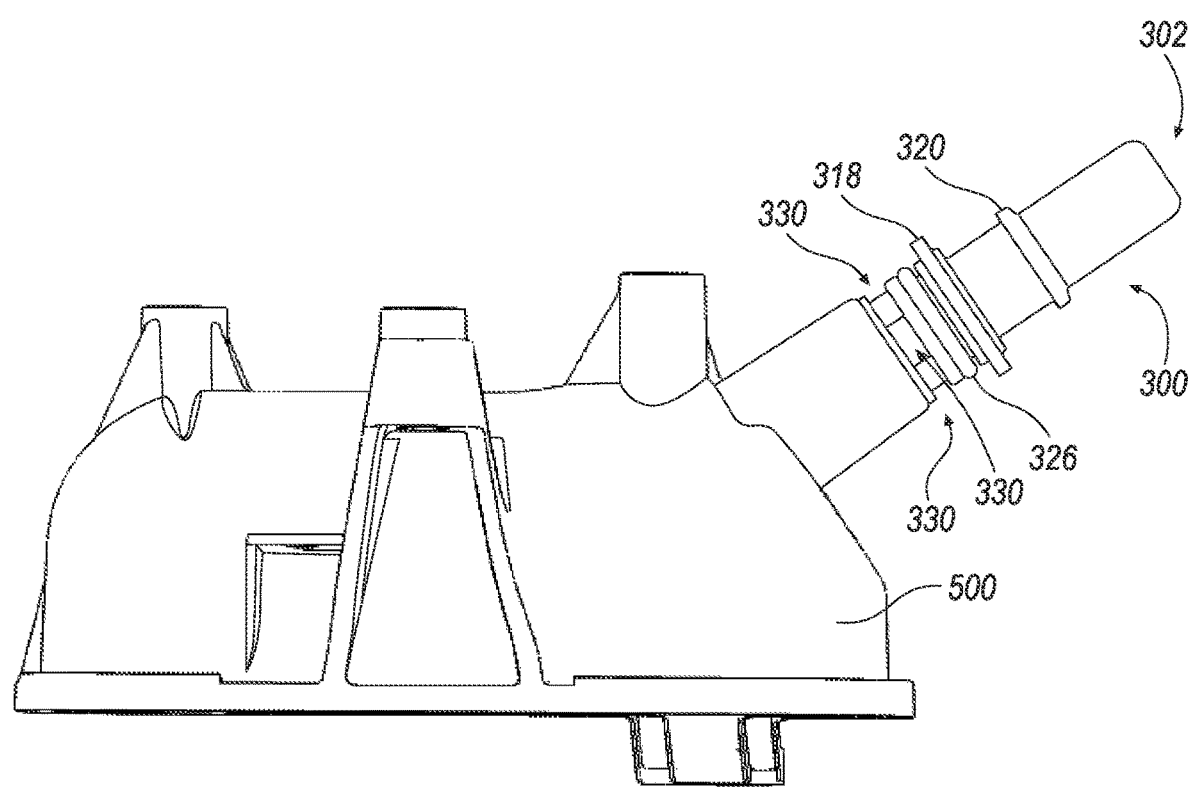
FIG. 6 is a side view of the PCV valve fully partially removed from the crankcase.

FIG. 6 shows this exemplary condition, and is a side view of the PCV valve fully partially removed from the crankcase. As can be appreciated and based on the discussion above, if a typical PCV valve is partially or fully removed from the crankcase, then full atmospheric pressure may be applied to the inlet of the PCV valve, therefore causing the compression spring to at least partially move the pintle away from its sealing position during normal operating conditions. Operation of a typical PCV valve may result in conditions where mass flow rates through the PCV valve are indistinguishable from one another, whether installed within the crankcase or not.

According to the disclosure the disclosed PCV valve 300 includes windows 330 that allow for a relatively large amount of air or gases to be introduced into the body of the PCV valve if PCV valve 300 is removed from the crankcase, as shown in FIG. 6. That is, when PCV valve 300 is at least partially removed from the crankcase 500, then second O-ring 326 is likewise removed from its sealing location against the inner surface of outer bore 502, exposing windows 330 so that air flow is introduced into the PCV valve. Accordingly, and under this condition, blowby gases produced during normal operation of the engine pass into the PCV valve but may escape into the environment due to the improper operation of the PCV valve.

Worse yet, if PCV valve 300 is entirely removed from crankcase 500, blowby and other engine gases would pass directly from outer bore 502 to the environment and without passing at all into PCV valve 300. But for the presence of windows 330, such operation would again be undetectable due to at least some measurable degree of air that would be passing through PCV valve 330.

PCV valve includes a tubular body 332 extending along an axis 334 between a first end 334 and a second end 336, tubular body 332 having an outer diameter 338 and an inner diameter 340 defining a wall 342 around a central passage 344 that extends through tubular body 332 and is orthogonal to axis 334. Metering device 308 is secured within central passage 344, adjacent first end 334. Wall 342 includes one or more windows 330 between metering device 308 and second end 336, and window(s) 330 define an air flow path 346 through wall 342 and into central passage 344 for detecting a disconnection of PCV valve 300 from crankcase 500. A total area of window(s) 330, or sum area of all windows 330, is greater than an open axial area 343 within metering device 308 when metering device 308 is in a maximum flow condition. That is, because of the relatively large size of a total cross-sectional area of windows 330, according to the disclosure, the amount of air that passes into or through window(s) 330 will exceed all flow of gases through metering device 308. As such, if a mass flow rate through PCV valve 300 is detected that exceeds any mass flow rate that can occur under normal operating conditions of the engine and through the PCV valve, then such flow is clearly not only detectable and distinguishable, but also known to be coming through window(s) 300 and providing proof-positive that the PCV valve is not properly seated in the crankcase, and may be entirely removed from it. Thus, according to the example, open axial area 343 corresponds to an axial area through which fluid flow during operation, which in this example is a total amount of area that is between an outer surface 341 of pintle 304, and an inner surface 345 of washer or seal ring 316. However, according to the disclosure, the area between outer surface 341 and inner surface 345 is but an example, and other PCV valve designs may have an amount of open area, in the open condition of the PCV valve, defined differently. According to the disclosure, therefore, the total cross-sectional area of windows 330 exceeds the area for maximum flow in a properly functioning PCV valve such that, if the PCV valve becomes dislodged from the crankcase, broken, or otherwise unsealed from the crankcase, then an excessive amount of gas flow passes therethrough and is detectable as an excessive mass flow rate.

Metering device 308 restricts and controls the amount of air flowing and passing pintle 304 and pintle seat 32 of the metering device 15. The spring 36 sets the force required from the difference in pressure between the air intake and the crankcase, when the force of the pressure difference allows the spring 36 to regulate the movement of the pintle 38 to open or close the metering device 15 within the engine and crankcase relative to the air intake. The metering device 15 in the illustrate PCV valve 10 is located adjacent to the first end 18 of the tubular body 16. An additional snap ring 40 or other known method or fastener located near the first end 18 may secures the pintle 38 and spring 36 within the metering device 15.

As such, in an uninstalled condition, FIG. 6, windows 330 allow for unmetered, and unregulated air to flow, and in a volume high enough that current OBDII and engine controller air sensors within the air intake detect an issue and notify the driver. The OBDII or engine controller due to the unregulated air flow may flag the error and warn of a disconnection or leakage of air reliably to comply with CARB standards for diagnostic and detection of the PCV valve connections.

According to the disclosure, window(s) 330 may be include any number of apertures, and in one example includes a plurality of at least two individual apertures. According to one example, each of window(s) 330 is rectangular in shape. The rectangular shape is advantageous because for the limited amount of space available in the axial region of the window(s) 330, the amount of open space is maximized, thereby providing the most efficient indication of a faulty PCV valve installation. In addition, circular, oblong, or oval shaped windows may limit the amount of flow into the PCV valve, and can result in wasted space axially. In other words, to achieve a maximum amount of window space, it is desirable in one example to use rectangular-shaped windows because wall space between one window and the next can be minimized, thereby allowing the total amount of openings in the window to be maximized in the given axial space that is available in the PCT valve.

In one example, the total area of the window(s) is greater than or equal to a cross-sectional area of the inner diameter near second end 336. In this aspect, a detection system can be clearly and readily calibrated such that, if this maximum air flow is detected due to the excessive amount of window area exposed for air passage, then the detection system readily detects an improperly installed PCV valve.

In one example, window 330 includes only one aperture 346, defined along an axial distance of the tubular body, such that the total area of aperture 346 is greater than the cross-sectional area of the inner diameter near the second end 336. Thus, whereas in the perspective view of PCV valve 300 in FIG. 3 multiple windows 330 are shown, it is contemplated that in one example only one window 346 is shown, such as that in FIG. 4. For example, each window 330 in a specific engine application may have a height 331 along axis 334 of to 7.85 mm and a width 333 of 7.83 mm and measured perpendicular to axis 334 and along an outer surface 335 of tubular body 332. Tubular body 332 in this example includes central passage 344 having an inner diameter of 11.5 mm through tubular body 332 and at axial opening 343. In this example, the aperture area for each of windows 330 is 61.47 mm$^2$ (i.e., 7.85 mm×7.83 mm). Central passage 344 has a diameter of 11.5 mm and a cross-sectional area of 103.87 mm$^2$ (i.e., A=π×(11.5/2)$^2$ mm$^2$), resulting in a ratio of the total area of aperture 346 summing all the windows 330, in this example 4, is 245.88 mm$^2$ (i.e., 61.47 mm$^2$×4) which is greater than the cross-sectional area of central passage 344 near the second end 336, and by an area ratio of 2.37 (i.e., 245.88 mm$^2$/103.87 mm$^2$). The PCV valve having the window 330 space around the tubular body 332 allows for the ratio to be tuned for each application and sensitivity of the air sensors to determine if any of the PCV valves have become dislodged. In other applications and according to the disclosure, the area ratio is approximately equal to or greater than 2 so as to ensure sufficient and unimpeded flow through the PCV valve, detectable by the detection system for flagging as an error or issue to be resolved to the operator.

According to the disclosure, a method of manufacturing a positive crankcase ventilation (PCV) valve includes providing a tubular body that extends along an axis between a first end and a second end, the tubular body having an outer diameter and an inner diameter defining a wall around a central passage that extends through the tubular body and is orthogonal to the axis, securing a metering device within the central passage, adjacent the first end, and positioning a window in the wall between the metering device and second end, wherein the window defines an air flow path through the wall and into the central passage for detecting a disconnection of the PCV valve from the crankcase, and wherein a total area of the window is greater than an open axial area within the metering device when the metering device is in a maximum flow condition.

Figure 7:
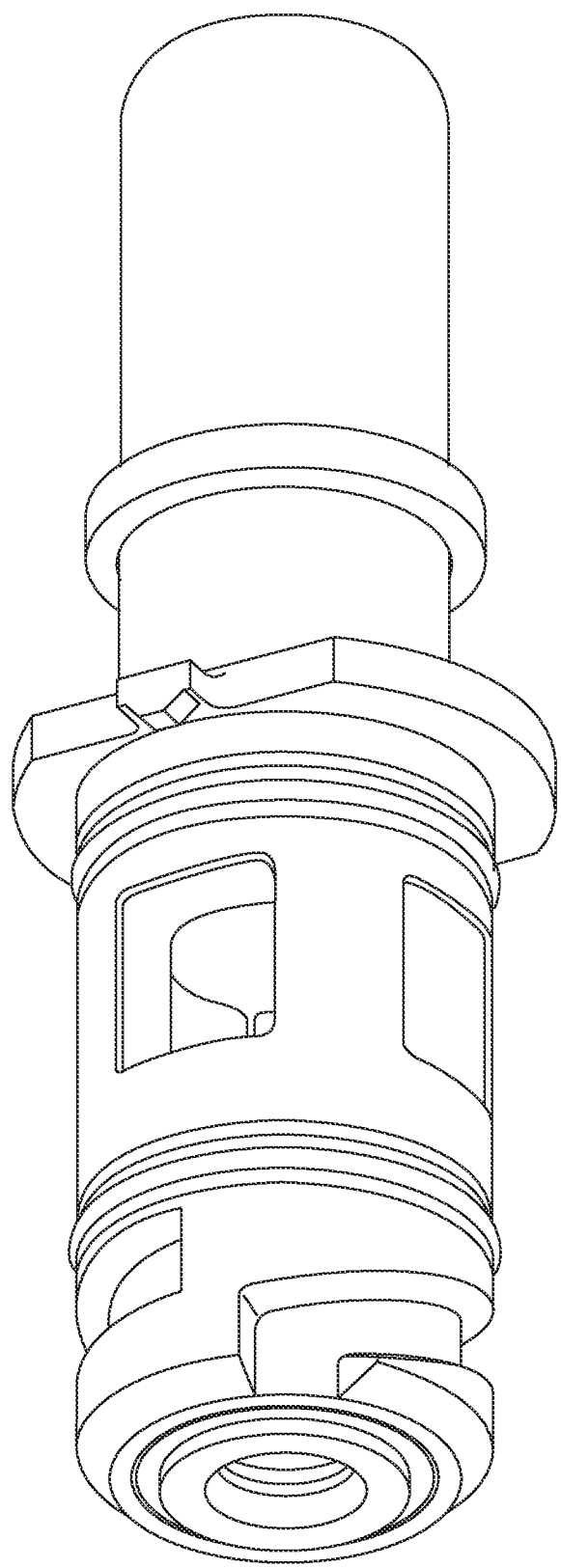
FIG. 7 is a perspective view of an ornamental design of an exemplary PCV valve.
Figure 8:
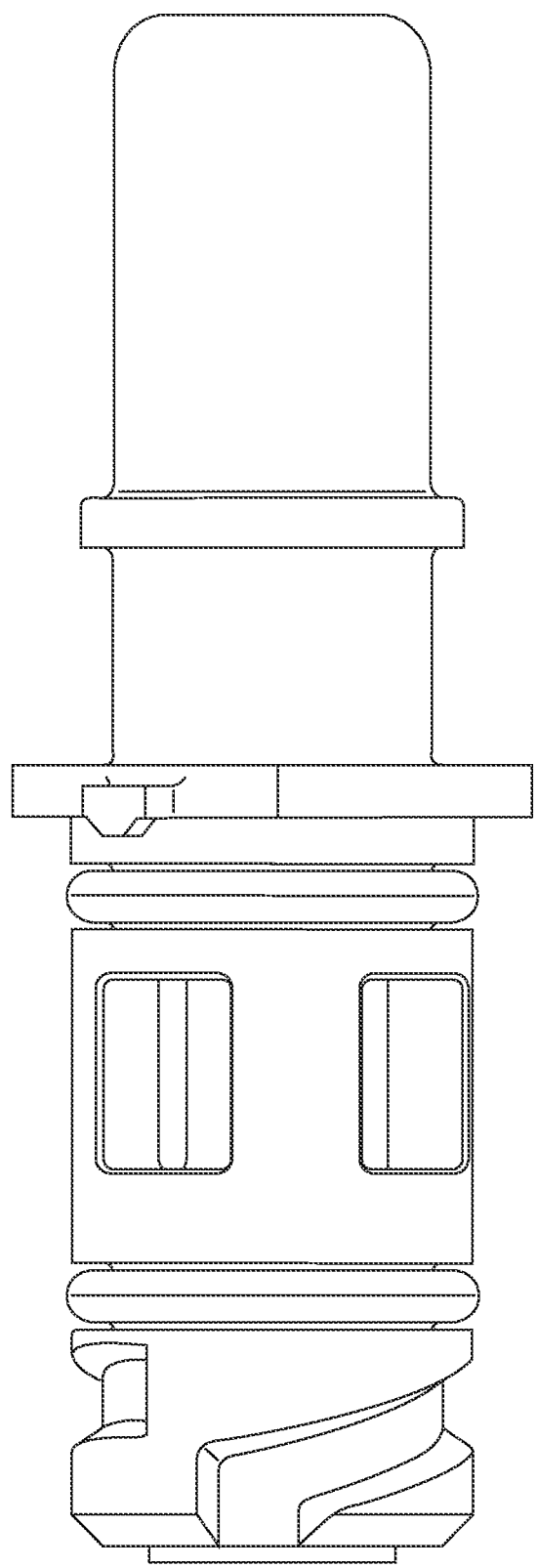
FIG. 8 is a front view an ornamental design of an exemplary PCV valve.
Figure 9:
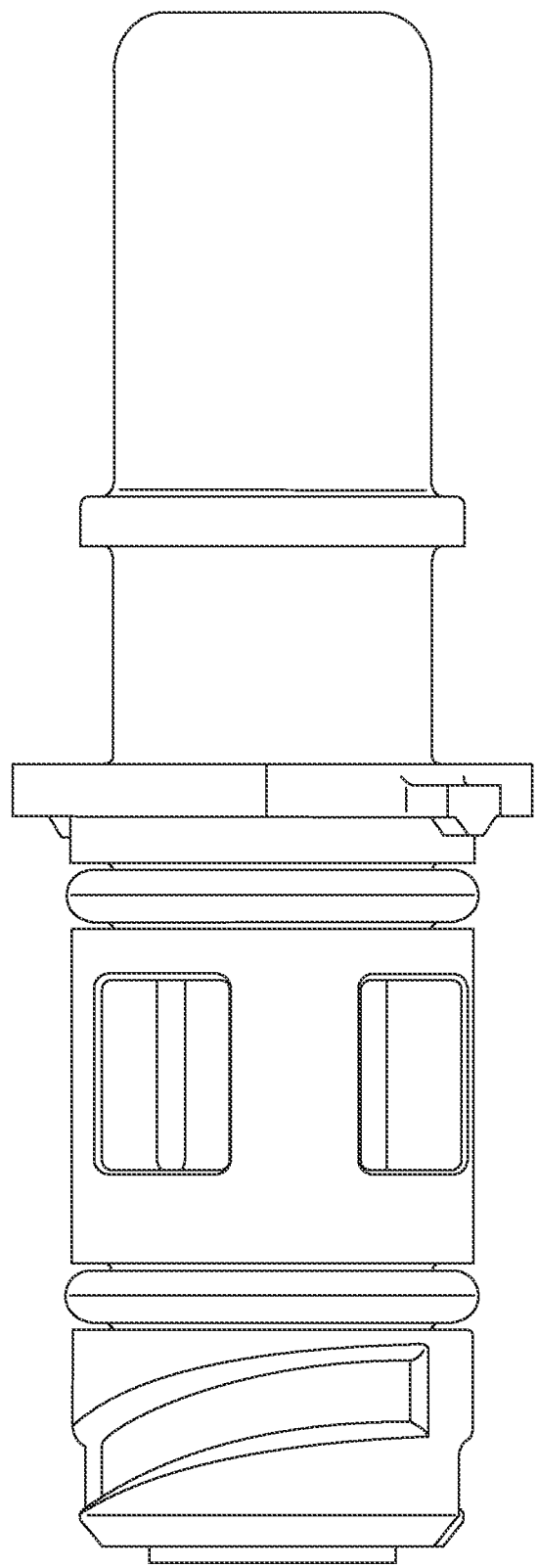
FIG. 9 is a back view an ornamental design of an exemplary PCV valve.
Figure 10:
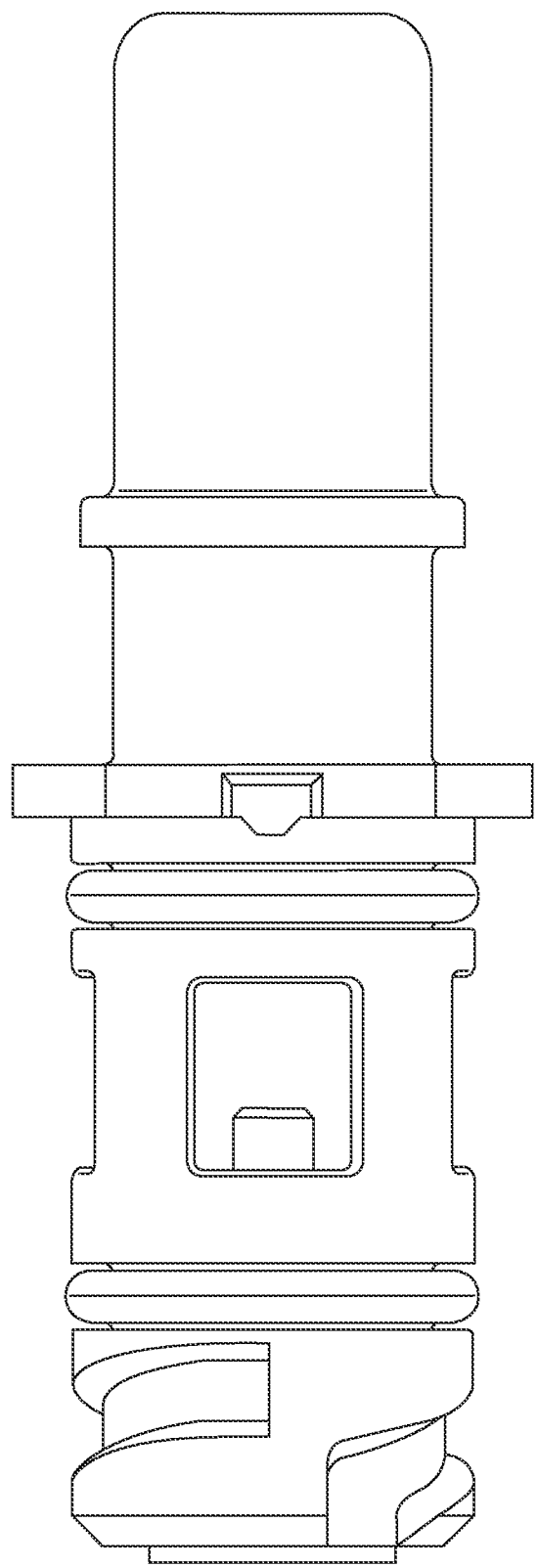
FIG. 10 is a left view an ornamental design of an exemplary PCV valve.
Figure 11:
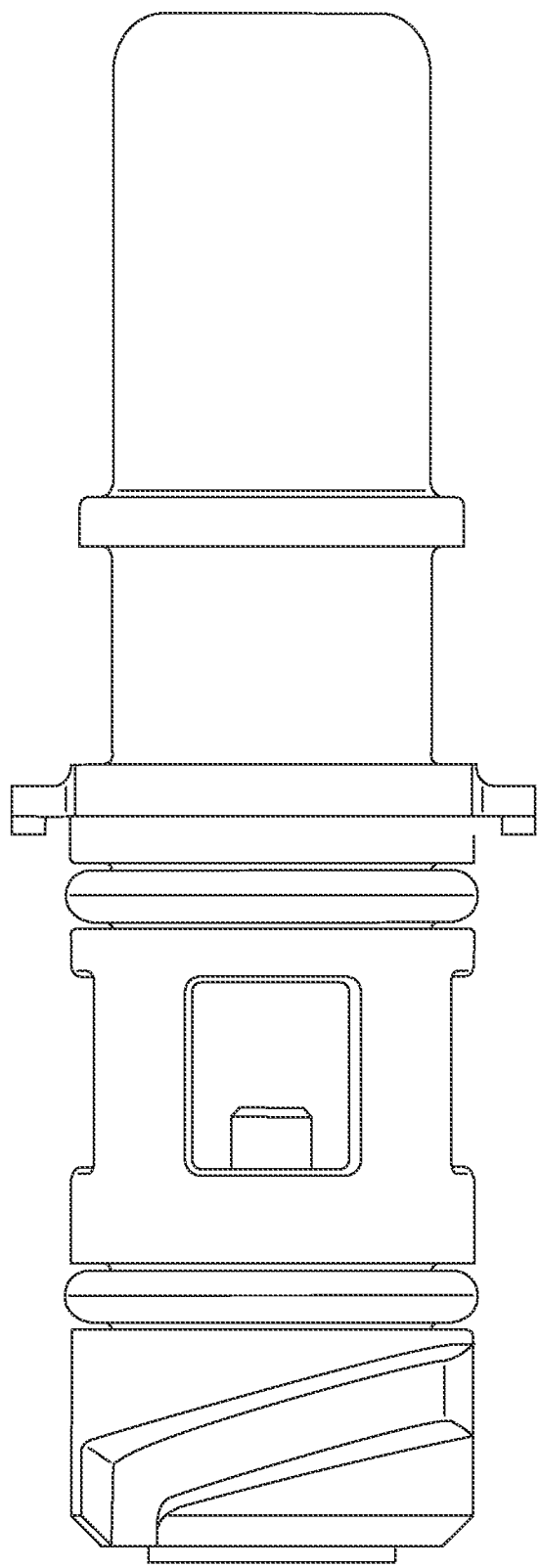
FIG. 11 is a right view an ornamental design of an exemplary PCV valve.
Figure 12:
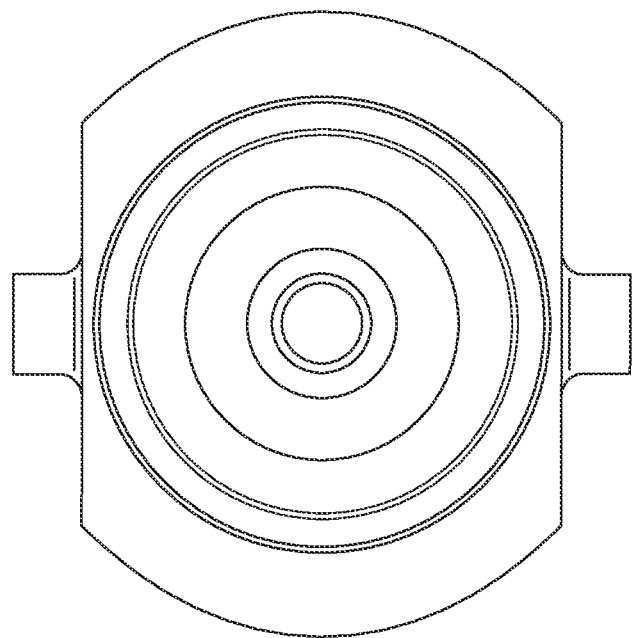
FIG. 12 is a top view an ornamental design of an exemplary PCV valve.
Figure 13:
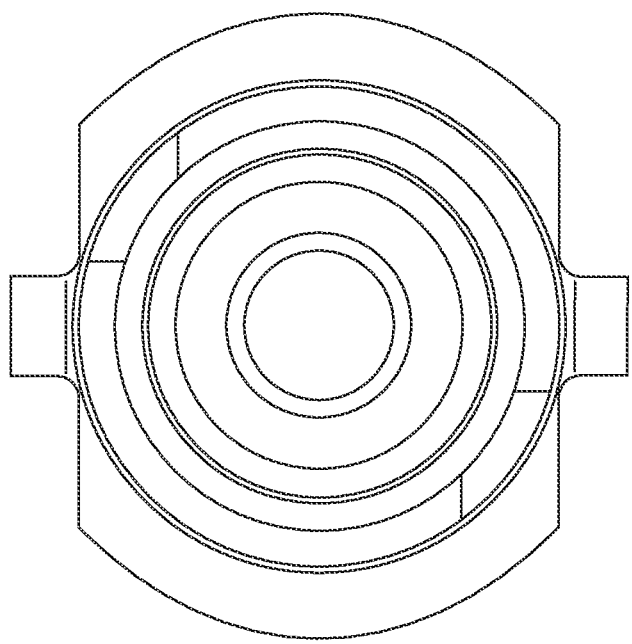
FIG. 13 is a bottom view an ornamental design of an exemplary PCV valve.

FIGS. 7-13 are included to highlight the unique design, shape and ornamental look that is unique to the exemplary PCV valve and the PCV valve within the crank case. FIG. 7 is a perspective view of an ornamental design of an exemplary PCV valve. FIG. 8 is a front view an ornamental design of an exemplary PCV valve. FIG. 9 is a back view an ornamental design of an exemplary PCV valve. FIG. 10 is a left view an ornamental design of an exemplary PCV valve. FIG. 11 is a right view an ornamental design of an exemplary PCV valve. FIG. 12 is a top view an ornamental design of an exemplary PCV valve. FIG. 13 is a bottom view an ornamental design of an exemplary PCV valve.

The exemplary illustrations are not limited to the previously described examples. Rather, a plurality of variants and modifications are possible, which also make use of the ideas of the exemplary illustrations and therefore, fall within the protective scope. Accordingly, it is to be understood that the above description is intended to be illustrative and not restrictive. The exemplary valve, window(s), seals and air flow volume may be used in other vehicle, emission, and air or vacuum systems where detection of a disconnection of a valve is critical to the operation. The valve body and window arrangements allow for a volume of air to pass unmetered and provide a volume that is detected or may cause an error code due to the engine controller's inability to compensate for the unregulated air flow through the windows. In the examples provided above the fluid is air, but such valve may be used with other media, fluids, and gases, and the purge air from the engine block, is only one application of the valve body, window passage design for by-passing the metering device within a valve.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," etc. should be read to recite one or more of the indicated elements unless a claim recites an explicit limitation to the contrary.

What is claimed is:

1. A positive crankcase ventilation (PCV) valve, comprising:
    a tubular body extending along an axis between a first end and a second end, the tubular body having an outer diameter and an inner diameter defining a wall around a central passage that extends through the tubular body and is orthogonal to the axis;
    a metering device secured within the central passage, adjacent the first end; and
    the wall having a window between the metering device and second end, and the window defines an air flow path through the wall and into the central passage for detecting a disconnection of the PCV valve from the crankcase, wherein a total area of the window is greater than an open axial area within the metering device when the metering device is in a maximum flow condition.

2. The PCV valve of claim 1, wherein the window includes a plurality of at least two individual apertures.

3. The PCV valve of claim 1, wherein the window is rectangular in shape.

4. The PCV valve of claim 1, wherein the total area is greater than or equal to a cross-sectional area of the inner diameter near the second end.

5. The PCV valve of claim 4, wherein the window includes only one aperture, defined along an axial distance of the tubular body, such that the total area of the aperture is greater than the cross-sectional area of the inner diameter near the second end.

6. The PCV of claim 1, the wall defining an outer surface with a groove between the window and the second end.

7. The PCV of claim 6, further including an O-ring seated in the groove for sealing the PCV valve when install into the intake manifold.

8. A method of manufacturing a positive crankcase ventilation (PCV) valve, comprising:
    providing a tubular body that extends along an axis between a first end and a second end, the tubular body having an outer diameter and an inner diameter defining a wall around a central passage that extends through the tubular body and is orthogonal to the axis;
    securing a metering device within the central passage, adjacent the first end; and
    positioning a window in the wall between the metering device and second end, wherein the window defines an air flow path through the wall and into the central passage for detecting a disconnection of the PCV valve from the crankcase, and wherein a total area of the window is greater than an open axial area within the metering device when the metering device is in a maximum flow condition.

9. The method of claim 8, wherein positioning the window includes positioning a plurality of at least two individual apertures.

10. The method of claim 8, wherein positioning the window includes positioning includes positioning a rectangular window.

11. The method of claim 8, wherein positioning the window includes positioning such that the total area is greater than or equal to a cross-sectional area of the inner diameter near the second end.

12. The method of claim 11, further comprising defining the window as only one aperture along an axial distance of the tubular body, such that the total area of the aperture is greater than the cross-sectional area of the inner diameter near the second end.

13. The method of claim 8, further comprising defining the wall having an outer surface with a groove between the window and the second end.

14. The method of claim 13, further including seating an O-ring in the groove for sealing the PCV valve when install into the intake manifold.

15. An engine, comprising:
a crankcase;
an air intake; and
positive crankcase ventilation (PCV) valve positioned in fluidic contact between the crankcase and the air intake, the PCV valve including:
- a tubular body extending along an axis between a first end and a second end, the tubular body having an outer diameter and an inner diameter defining a wall around a central passage that extends through the tubular body and is orthogonal to the axis;
- a metering device secured within the central passage, adjacent the first end; and
- the wall having a window between the metering device and second end, and the window defines an air flow path through the wall and into the central passage for detecting a disconnection of the PCV valve from the crankcase, wherein a total area of the window is greater than an open axial area within the metering device when the metering device is in a maximum flow condition.

16. The engine of claim 15, wherein the window includes a plurality of at least two individual apertures.

17. The engine of claim 15, wherein the window is rectangular in shape.

18. The engine of claim 15, wherein the total area is greater than or equal to a cross-sectional area of the inner diameter near the second end.

19. The engine of claim 18, wherein the window includes only one aperture, defined along an axial distance of the tubular body, such that the total area of the aperture is greater than the cross-sectional area of the inner diameter near the second end.

20. The engine of claim 15, the wall defining an outer surface with a groove between the window and the second end, further including an O-ring seated in the groove for sealing the PCV valve when install into the intake manifold.

* * * * *